United States Patent Office 3,208,913
Patented Sept. 28, 1965

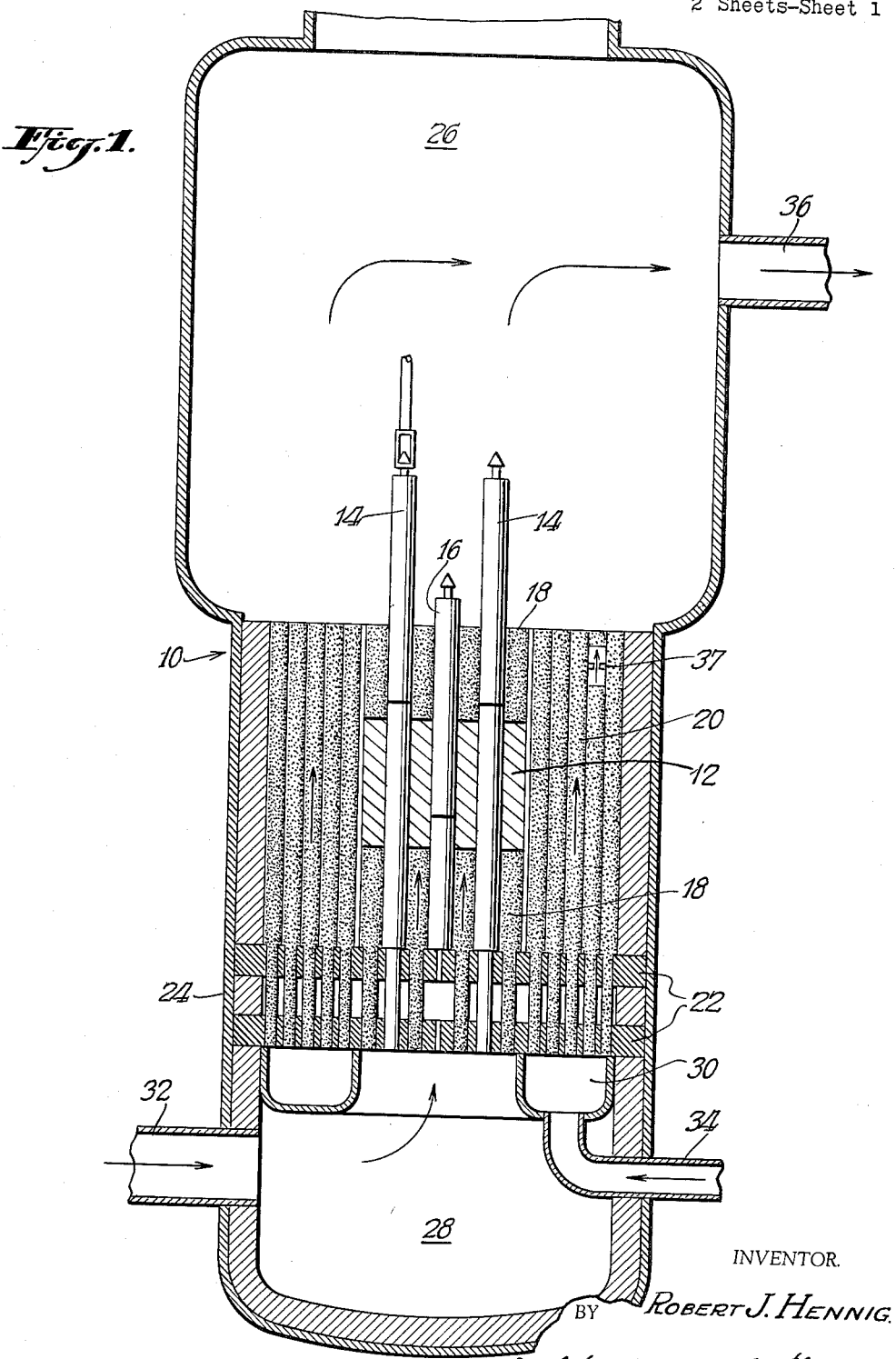

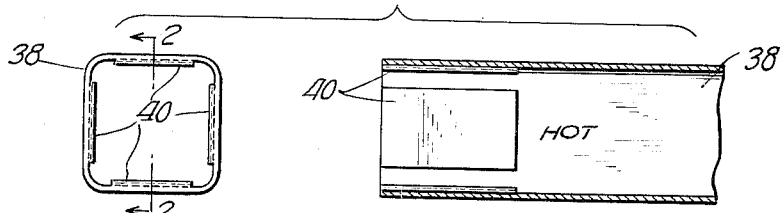
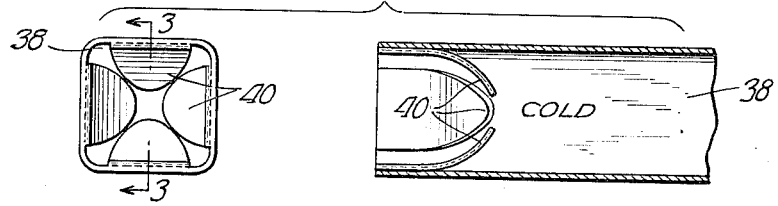
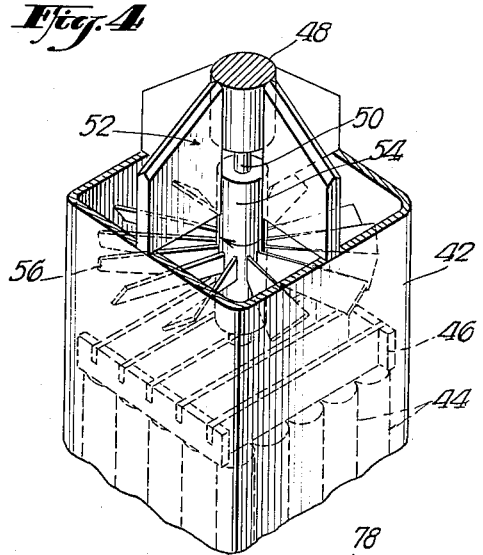
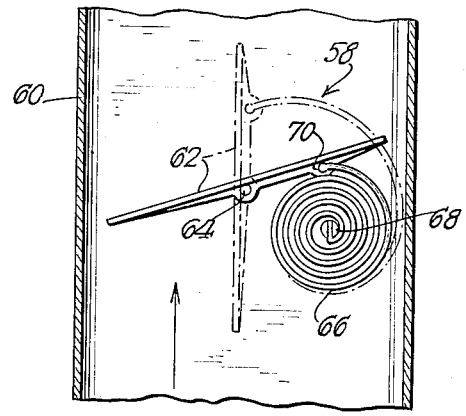
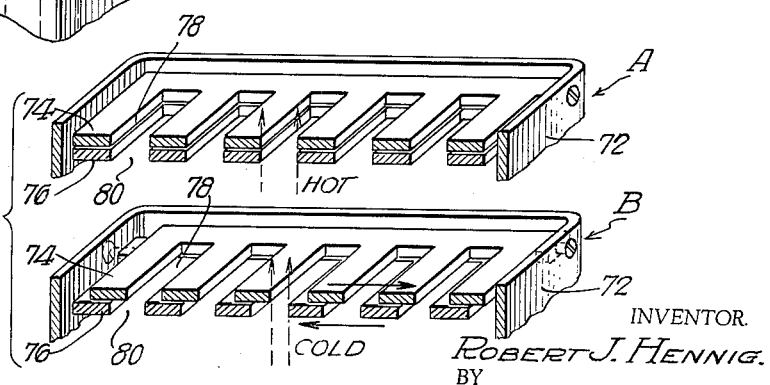

3,208,913
TEMPERATURE FLOW CONTROL OF COOLANT IN A REACTOR
Robert J. Hennig, Benton City, Wash., assignor to Atomic Power Development Associates, Inc., Detroit, Mich., a corporation of New York
Filed Apr. 17, 1963, Ser. No. 273,707
3 Claims. (Cl. 176—20)

This invention relates to nuclear reactors and more particularly to subassemblies contained therein.

One of the basic characteristics of a nuclear reactor is the enormous amount of energy that is released, producing great quantities of heat as well as structural strain. Therefore, adequate cooling means are essential for the proper functioning of the reactor. A typical atomic reactor comprises a series of subassemblies including core subassemblies, radial and axial blanket subassemblies, operating control rods, and safety rods. Such subassemblies contain passages therein in which coolant is circulated in order to control or maintain the desired temperature thereof, and further, to transfer the heat of fission of the nuclear reaction to a remote, usable location where said heat energy is converted into electrical energy for well known purposes.

The actual temperature as well as the temperature range for each individual subassembly varies depending upon the individual use of the subassembly, such as a core subassembly or a blanket subassembly, for example. There is a particularly large temperature gradient between subassemblies when the reactor is initially placed into operation because the coolant contained in the core area thereof tends to heat much faster than the coolant contained in or passing through the blanket portions. Actually there are two basic reasons for this temperature differential, the first being that the core area dissipates or releases considerably more heat energy and secondly, there is a larger pressure drop of the coolant as it flows through the core area. Thus, some subassemblies have a high coolant outlet temperature while other subassemblies have a low coolant outlet temperature. Examples of the latter include subassemblies positioned near the edge of the core, subassemblies partially spent, and control subassemblies.

In view of the foregoing, one of the features of the present invention is the provision of means for controlling the coolant flow through individual subassemblies in order to maintain the desired temperature thereof. Thus, each subassembly is maintained at its own desired temperature. Further, another feature of the present invention is the provision of means whereby the coolant discharged from each subassembly is maintained at a preselected temperature. As is well known to those skilled in the art, a power plant operates with greater thermal efficiency when the ambient temperatures thereof are as high as practical. Hence, in order to achieve higher overall efficiencies in an atomic reactor, it is also desirable to maintain the coolant temperatures as high as practical within structural limitations. Thus, another object of this invention is to maintain the temperature of the coolant as high as possible, but slightly below the critical or dangerous limits of the structural components thereof. That is, the coolant discharged from each subassembly is maintained at as high a temperature as is practical to obtain based upon structural limitations. Further, such control of the coolant temperature allows for the coolant to be maintained in its desired state such as a fluid, a gas, or a liquid, for example.

The invention in still another aspect thereof provides means whereby the temperature of each subassembly may be maintained within preselected limits or ranges by controlling the coolant flow rate therethrough. Thus, applicant's concept includes the provision of individually controlled temperature regulator devices which regulate the volumetric flow of coolant through each individual subassembly and thereby controls the temperature rise or build-up within each subassembly. That is, the larger the flow of coolant through the subassembly, the lower the coolant outlet temperature and, therefore, the lower the operating temperature of said subassembly. Thus, applicant provides means whereby the coolant outlet temperature is measured and the flow of such coolant through the subassembly is restricted in accordance with the temperature thereof. Moreover, applicant's means for restricting the coolant flow automatically compensates for variation in the pressure to which same is subjected. It is to be understood that such flow restriction may be effected without the necessity of dismantling the apparatus. That is, the rate of coolant flow is modified without disturbing or disassembling the reactor itself.

Due to the nature of an atomic reactor installation, such a flow controller must not unduly restrict the flow of the coolant therethrough when the subassembly is in its "hot" condition and the full flow of the coolant therethrough is required. Further, such a device must be "fail-safe." That is, the device muct be constructed in such a manner that in the event of failure thereof, the flow of coolant therethrough will not be terminated or unduly restricted.

The concept of the present invention is intended to cover the use of a variety of different coolant materials such as inter alia gas, solids, liquids, liquid metals, or organic materials, for example.

Further objects, features and advantages of the invention hereof will appear from the following detailed description given below taken in conjunction with the accompanying drawings which form a part of this specification and illustrate by way of example, preferred embodiments of the invention.

In the drawings,

FIG. 1 is a vertical sectional view of a typical atomic reactor;

FIG. 2 is an end view and a sectional view taken along line 2—2 of said end view showing a bimetallic fin type flow controller in an extended position;

FIG. 3 is an end view and a sectional view taken along line 3—3 of said end view showing a bimetallic fin type flow controller in an arcuate position;

FIG. 4 is a perspective view, partially broken away, showing a rotating vane type flow controller constructed in accordance with the invention;

FIG. 5 is a sectional view of a bimetallic coil type flow controller; and

FIG. 6 is a pair of perspective views, partially broken away, showing a grid type flow controller having hot coolant passing therethrough in one view thereof and showing the same grid type flow controller having cold coolant passing therethrough in a second view thereof.

Referring now to the drawings in more detail, FIG. 1 shows a typical nuclear reactor designated generally at 10 having a plurality of subassemblies positioned therein.

Centrally disposed are a plurality of core subassemblies 12 and interposed between such core subassemblies are a plurality of safety rods, two being shown at 14. Further, penetrating the core area is at least one operating control rod 16. Positioned directly above and below the core subassemblies 12 are axial blanket subassemblies 18, and positioned outwardly from the core subassemblies 12 are a plurality of radial blanket subassemblies 20. The lower ends of the aforementioned subassemblies are held in position by means of support plates 22 which are connected to the inside wall of the reactor vessel 24. The upper portion of the reactor is provided with a large encased cavity or handling compartment 26 which comprises means for grasping the upper ends of the various subassemblies for removal thereof or for changing the position of such subassemblies.

The lower portion of the reactor is divided into two plenum chambers including a core plenum chamber 28 and a blanket plenum chamber 30. Two plenum chambers are employed for the introduction of coolant into the reactor due to the fact that the core coolant is normally supplied at a pressure which is greater than the pressure of the coolant supplied to the blanket subassemblies. Thus, in one embodiment coolant is supplied to the bottom of the subassemblies and flows upwardly therethrough to the top of such subassemblies from whence it is discharged into the fuel handling compartment 26. From the handling compartment 26 the coolant in a heated state passes thrugh the outlet 36 to the intermediate heat exchanger (not shown) where the heat is extracted from the coolant for conversion into electrical energy for well known purposes.

As mentioned heretofore, various subassembies produce considerably more or less heat than others. Further, each individual subassembly may produce different quantities of heat depending upon whether such subassembly is partially used up (spent) or has just been initially placed into operation. In order to maintain the coolant at as high a temperature as possible consistent with the structural characteristics of the individual subassemblies, applicant has conceived means for controlling the flow through each individual subassembly based upon the coolant outlet temperature thereof. Such means are schematically shown at 37, in FIG. 1.

Referring now to FIG. 2, there is shown an end view and a sectional view taken along line 2—2 of said end view and showing a bimetallic fin type flow controller in an extended position. The coolant conduit 38 shown is positioned adjacent the coolant outlet of a subassembly so that the flow controller is in close proximity of such outlet. It is to be noted that FIG. 2 illustrates the bi-metallic fins when the coolant passing through the conduit 38 is relatively hot whereas FIG. 3 illustrates the same bimetallic fins when the coolant passing through the conduit 38 is in a relatively cold condition. Thus, it is seen that the bimetallic fins 40 move to their elongated or extended position with the free ends thereof closely adjacent the side walls of the conduit 38 when the temperature of the coolant is relatively hot. One end of the fins 40 is connected to the inside wall of the conduit 38 and when the coolant flowing through the conduit 38 is relatively cold the free ends of the fins have a tendency to curve arcuately inwardly as shown due to their bimetallic construction. When the fins have assumed their arcuate position they restrict or reduce the flow of the coolant through the conduit 38 and when such flow of coolant is reduced the residual time of the coolant within the subassembly is correspondingly increased and, therefore, the coolant absorbs a greater quantity of heat from the subassembly and the exit temperature of the coolant increases. Hence, it is seen that the flow controller is automatically self-adjusting and maintains the temperature of the outgoing coolant substantially constant.

Referring next to FIG. 4, there is shown another embodiment of a flow controller constructed in accordance with the concept of the present invention. The complete flow controller is positioned adjacent the upper or outlet portion of the subassembly. An outside wrapper or can 42 encases a plurality of vertically extending fuel pins 44 which are held in position by means of hold down contacts 46. At the top of the subassembly is a handling head 48 which connects to the hold down contacts 46. Extending downwardly from the handling head 48 is a vane pin or axle 50 and mounted on the axle 50 is a rotating vane assembly. Such assembly comprises a hub portion 54 and a plurality of vanes or blades 56 radially extending therefrom. Particular attention is directed to the fit between the hub 54 and the axle 50. The hub 54 has a higher coefficient of thermal expansion than the axle or pin 50 and, therefore, when the temperature of the coolant passing through the subassembly is relatively cool the hub contracts and forceably fits about the axle 50 so that the vanes will remain stationary as the coolant passes thereby. Hence, the restriction of the coolant passing by the stationary vanes acts as a throttle or damper so that the flow of the coolant is reduced. Such a reduction in the flow of the coolant may be in the order of 30 to 60% of the total flow of such coolant. When the temperature of the coolant increases until it reaches a predetermined amount such as, for example, 850° F. the hub will expand sufficiently so that there will be a free, rotating fit between the axle 50 and the hub 54, and the vanes 56 will rotate. Since the rotating vane assemby is free to turn, and being motivated by the axial forces induced by the flow of the coolant therethrough, the dampening or restrictive throttling of the coolant passing through such rotating vane assembly is considerably reduced and substantially full flow of the coolant will pass thereby. Thus, the coolant outlet temperature is automatically maintained at a preselected value depending upon the expansion of the hub 54 and the axle 50.

Referring now to FIG. 5, there is shown a bimetallic coil type flow controller constructed in accordance with the concepts of the present invention. The damper assembly designated generally at 58 is positioned towards the outlet of the subassembly outlet conduit 60. A damper or plate 62 is pivotally mounted upon shaft 64 provided for the purpose. A bimetallic coil 66 is provided having one end thereof fixedly mounted at 68 and the other end thereof connected to the damper 62 at 70. The flow of coolant passes in an upwardly direction as viewed in FIG. 5 and the damper 62 assumes a transverse (shown in solid lines) position when the coolant flowing upwardly is at a relatively low temperature. As the coolant temperature gradually increases the bimetallic coil expands until it ultimately reaches the position illustrated by the dotted lines in FIG. 5 when the temperature of the coolant is relatively hot. Thus, it is seen that when the coolant is at a relatively low temperature the flow thereof is restricted in order to retain such fluid within the subassembly for a longer period of time and thereby heat such coolant to a higher temperature. When the coolant reaches higher preselected temperatures, the damper will gradually open allowing for increased flow of coolant therethrough and thereby lowering the residual time of the coolant within the subassembly and reducing the amount of heat energy transferred thereto. Hence, it is seen that an automatic self compensating coolant flow controller is provided. Further, it is to be pointed out that the actuation of the bimetallic coil and damper is not only a function of the coolant temperature but is also a function of the coolant pressure, since the bimetallic coil is a spring-like element. In other words if the damper is adjusted to open at a given coolant temperature and if the coolant pressure is reduced, then the damper will not open until a temperature greater than the aforementioned given temperature is reached. The same result would be obtained if the subassembly pressure drop characteristic increased by means of fuel swelling, for example.

Referring next to FIG. 6, there is shown another embodiment of a flow controller constructed in accordance with this invention. View A shows the controller when coolant at a relatively hot temperature is passing therethrough and view B illustrates the same controller when a coolant having a relatively low temperature is passing therethrough. The outside wrapper or can 72 supports a pair of bar grids 74 and 76. It is to be noted that the grids are either manufactured from different material one from the other, or one of the grids may be movably mounted on the outside wrapper or can 72. Thus, when relatively hot coolant is passing therethrough the temperature thereof heats the grids so that the slots 78 and 80, respectively, are in alignment one with the other and, thus, do not restrict the flow of coolant therethrough. When the temperature of the coolant decreases, the grids contract at different rates so that the slots 78 in the upper grid 74 do not align with the slots 80 in the lower grid 76 and, therefore, the flow of coolant therethrough is correspondingly decreased or restricted.

Particular attention is directed to the fact that in each one of the aforementioned embodiments, the construction is such that in the event that the structure fails, the coolant will never be entirely restricted from passage therethrough. This is an important consideration in order to prevent structural failure of the subassembly in an atomic reactor.

Although several embodiments of the invention are herein disclosed for purposes of explanation, further modifications thereof, after study of this specification will be apparent to those skilled in the art to which the invention pertains. Reference should accordingly be had to the appended claims in determining the scope of the invention.

What is claimed and desired to be secured by Letters Patent is:

1. In an atomic reactor having a plurality of subassemblies through each of which in operation a stream of coolant is adapted to flow and in each of which different amounts of heat tend to be generated with consequent differences in the temperature of the coolant discharged therefrom, means for regulating the volumetric flow of coolant through each of said subassemblies individually and thereby to control and limit the temperature of each respectively, comprising a throttling means including means located in the coolant being discharged from each subassembly and actuatable responsive to varying temperature of such discharging coolant to change the degree of such throttling and wherein said means located in the coolant being discharged comprises a plurality of bimetallic fins positioned adjacent said stream of coolant in each of said subassemblies, the free ends of which assume a normally extended position parallel to said stream, and the free ends of said fins being adapted for inwardly arcuate movement in response to the temperature of coolant passing thereby.

2. In an atomic reactor having a plurality of subassemblies through each of which in operation a stream of coolant is adapted to flow and in each of which different amounts of heat tend to be generated with consequent differences in the temperature of the coolant discharged therefrom, means for regulating the volumetric flow of coolant through each of said subassemblies individually and thereby to control and limit the temperature of each respectively, comprising a throttling means including means located in the coolant being discharged from each subassembly and actuatable responsive to varying temperature of such discharging coolant to change the degree of such throttling and wherein said means located in the coolant being discharged comprises a handling head, an axle supported by said handling head, a vane assembly mounted on said axle, and said vane assembly adapted for rotational movement relative to said axle responsive to the temperature of the coolant passing thereby.

3. In an atomic reactor having a plurality of subassemblies through each of which in operation a stream of coolant is adapted to flow and in each of which different amounts of heat tend to be generated with consequent differences in the temperature of the coolant discharged therefrom, means for regulating the volumetric flow of coolant through each of said subassemblies individually and thereby to control and limit the temperature of each respectively, comprising a throttling means including means located in the coolant being discharged from each subassembly and actuatable responsive to varying temperature of such discharging coolant to change the degree of such throttling and wherein said means located in the coolant being discharged comprises a pair of slotted grids mounted within said stream and adjacent one another, said grids being adapted so that slots contained therein register one with the other in response to the temperature of the coolant passing thereby.

References Cited by the Examiner

UNITED STATES PATENTS

| | | | |
|---|---|---|---|
| 2,278,421 | 4/42 | Brown | 236—34 |
| 2,437,287 | 3/48 | Woods | 236—35.2 |
| 2,877,170 | 3/59 | Greenhalgh | 176—87 |
| 3,087,885 | 4/63 | Ertaud | 176—33 |

FOREIGN PATENTS

| | | |
|---|---|---|
| 792,171 | 3/58 | Great Britain. |
| 858,504 | 1/61 | Great Britain. |

OTHER REFERENCES

Perry: "Chemical Engineer's Handbook," 3rd edition, 1950, published by McGraw-Hill, p. 787.

REUBEN EPSTEIN, *Primary Examiner.*

CARL D. QUARFORTH, *Examiner.*